United States Patent [19]

Husta

[11] Patent Number: 5,098,128
[45] Date of Patent: Mar. 24, 1992

[54] COMPUTER MONITOR PAD HOLDER

[76] Inventor: Richard P. Husta, 17 Calvin Rd., Wilton, Conn. 06897

[21] Appl. No.: 756,989

[22] Filed: Sep. 9, 1991

[51] Int. Cl.⁵ .............................................. B42D 3/00
[52] U.S. Cl. ......................................... 281/45; 281/51
[58] Field of Search ..................... 281/43, 44, 45, 51; 40/643, 642, 371

[56] References Cited

U.S. PATENT DOCUMENTS

| | | | |
|---|---|---|---|
| 2,200,499 | 5/1940 | Haveles | 281/51 |
| 3,084,473 | 4/1963 | Castro | 281/44 X |
| 3,085,134 | 4/1963 | Bissonnette et al. | 281/44 X |
| 5,025,919 | 6/1991 | Brinker et al. | 281/51 X |
| 5,056,822 | 10/1991 | Shim | 281/51 X |

Primary Examiner—Timothy V. Eley
Assistant Examiner—Willmon Fridie, Jr.
Attorney, Agent, or Firm—Edward R. Hyde

[57] ABSTRACT

A holder for a looseleaf pad that is adapted to be mounted to a computer monitor or similar device. The holder may be mounted to either the left or right vertical side of the monitor or to a horizontal surface such as the monitor top. The holder has an L-bracket having a horizontal arm and a vertical arm that may be attached to either end of the horizontal arm depending on whether the user desires to mount the device on the left or right side of the monitor.

13 Claims, 2 Drawing Sheets

COMPUTER MONITOR PAD HOLDER

BACKGROUND OF THE INVENTION

1. Field of the Invention

The present invention relates to a copy or document holder and more particularly to a holder for a pad to be mounted on the display terminal of a computer or other similar device.

Computer users in the operation of the computer regularly require information such as passwords, commands, telephone numbers and other data which is useful or required for operation of the computer. Customarily this information is in note pads or books that may be on or in the vicinity of the computer user. Conversely, in the operation of the computer it is often desirable to jot down information which will be retrieved at a later time in the computer operation.

Accordingly it is desirable to have a loose leaf ring pad that is conveniently located for the computer operator so that he can either retrieve or enter information relating to the computer operation. The present invention is directed to a device that serves as a copy or document holder which may be mounted to the computer display terminal and provides organizational capability for information that may be either retrieved or recorded.

2. Description of the Prior Art

There exists a considerable number of devices for holding documents and adapted to be mounted to computers or similar devices. Examples of such document holders are found in U.S. Pat. Nos. 4,693,443 and 4,902,078. Most of these prior art document holders rely upon spring clips for clipping the documents to a supporting or backing plate. Some of these devices are hinged for adjustability and include various types of arrangements to secure the holder to the computer monitor. However, these prior art devices lack various features that a computer operator would find desirable. These include organizational capability for the information being retrieved or recorded, convenience of flipping from one page to another, rigidity of the mounting of the device to permit easy writing with minimum movement or vibration of the document and convenient mounting or installation of the device to the computer monitor in any one of a variety of desirable locations. The present invention provides a unique document holder that overcomes the disadvantages of the prior art and provides the above noted and other desirable features.

SUMMARY OF THE INVENTION

Against the foregoing background, it is a primary object of the present invention to provide a holder for documents or a pad of documents in which the holder may be conveniently mounted to a computer monitor or display terminal.

It is a further object of the present invention to provide a document holder in which the pad of documents provides organizational capability for easy retrieval and recording of pertinent information by the computer operator.

It is a still further object of the present invention to provide a document holder in which the documents are at a proper angle so that the operator need not refocus his eyes in the back and forth viewing of the display terminal and documents. Further, an object of the invention is to angle the pad of documents for most convenient writing and flipping over of pages.

Accordingly, the present holder contemplates a two part L-bracket having a vertical arm and a horizontal arm and in which the vertical arm may be mounted to either side of a display terminal. This alternate side mounting is achieved by having the vertical arm detachably mounted from the horizontal arm and capable of being mounted at either end thereof. A pad backing plate and a loose snap ring strip is secured to the horizontal arm of the bracket in a manner to permit a pad of documents to be flipped for the convenience of the operator.

A particularly important feature of the present invention is the angular arrangement of the L-bracket, described in detail hereinafter, to permit the holder to form a compound or double angle with the face of the display terminal. A first angle measured from the vertical results in the tilting back of the pad to facilitate writing of notations. In addition, this angle enables the chosen page of a vertically turned loose leaf ring pad to remain exposed as will become apparent from the hereinafter described specific embodiment.

The second of the compound angle measured from the horizontal permits a substantially constant distance or radius from the user's eye to both the viewing screen and the pad. Thus in moving the eyes from one to another, refocusing is not necessary and thus eye strain is minimized.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein in which.

DESCRIPTION OF THE PREFERRED EMBODIMENT

Figure 1:
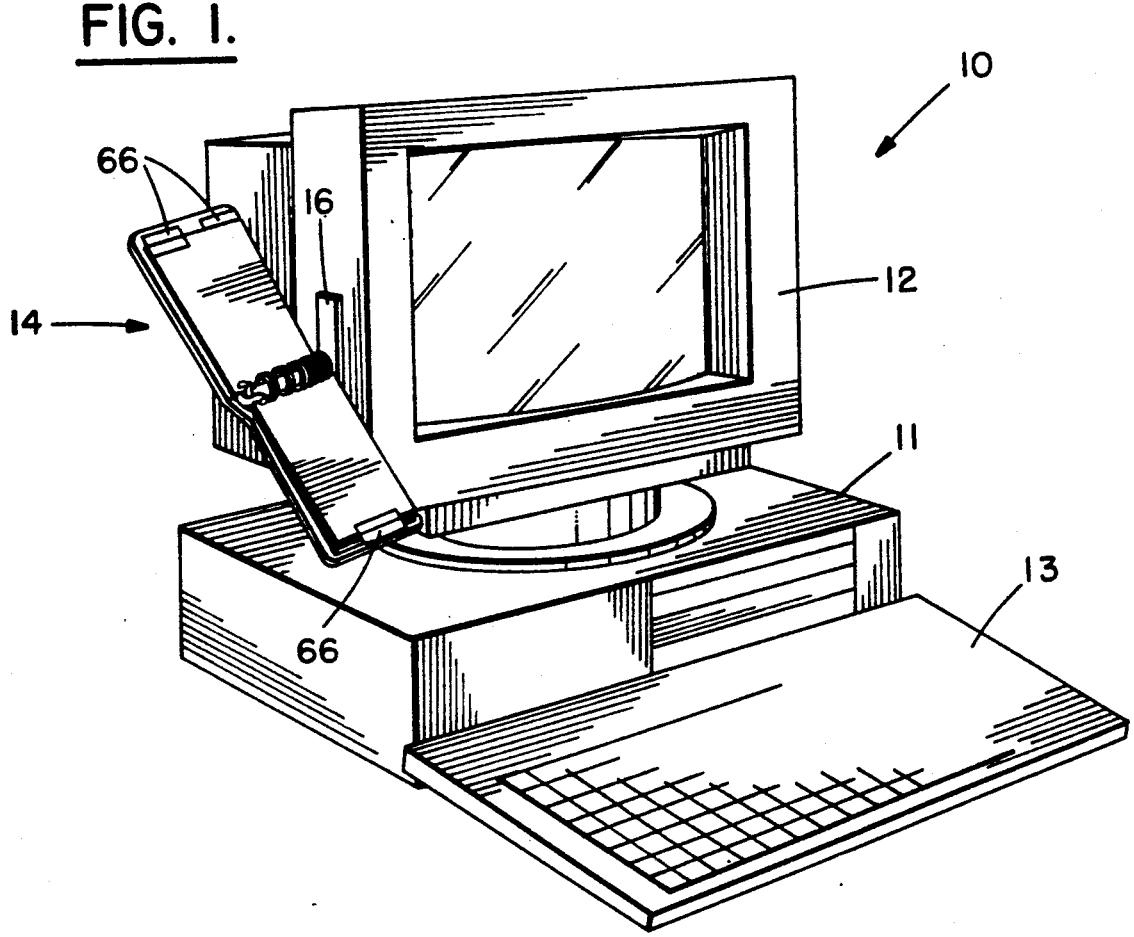
FIG. 1 is a perspective view of a computer terminal with the document holder secured to the left side thereof.

Referring now to the drawings and more particularly to FIG. 1, there is shown a computer terminal generally indicated at 10 comprising the customary microprocessor 11, monitor screen 12 and keyboard 13. The document holder of the present invention is generally indicated as 14 and in FIG. 1 it is shown mounted to the left side of the monitor 12 for easy view and use by an operator of the computer. The document holder is mounted to the monitor by an L bracket the vertical arm 16 of which is seen in FIG. 1 as secured to the side of the monitor. The horizontal arm of the L-bracket extends to the left as shown in FIG. 1 to securely hold the document pad in a fixed angled position as will be more fully described hereinafter. The pad may conveniently be of the snap ring loose leaf type as shown in the drawings.

Figures 3A, 3B:
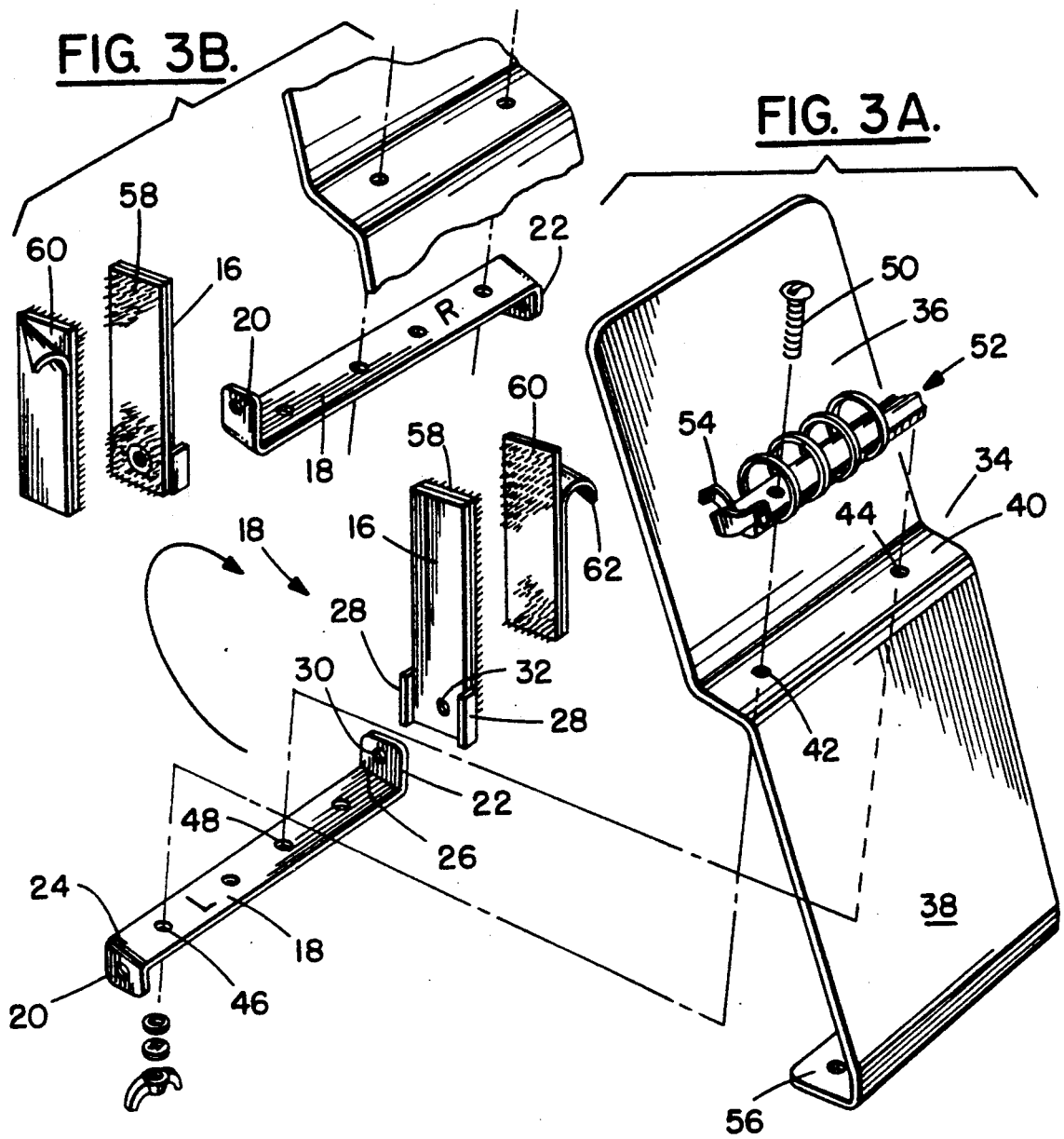
FIGS. 3A and 3B are exploded views of the document holder.

Referring now to FIG. 3A, the mounting L-bracket is generally indicated at 18 and is seen to comprise vertical arm 16 and horizontal arm 18 which are detachable to permit either left or right side mounting. The ends 20 and 22 of horizontal arm 18 are bent in opposite directions and the bend lines 24 and 26 are parallel to each other and at an angle with the axes of arm 18 resulting in a compound angle for the holder which will be further described. The vertical arm 16 has formed retainer sections 28 which receive bent up end 22 of arm 18 and the two arms are secured together by a suitable machine screw fastener (not shown) passing through holes 30 and 32, or alternatively, hole 32 may be threaded to receive a suitable screw. It is understood that the retainer sections 28 prevent relative rotation of the arms 16, 18. Alternatively, the outer surface of end 22 and the lower inner surface of arm 16 could be provided with a mating projection-depression or dimple arrangement to prevent rotation.

A backing plate 34 is secured to the horizontal arm 18 to hold the document pad. Plate 34 has an upper section 36, lower section 38 and an offset angled center 40, having a width approximately that of bracket arm 18, and a pair of holes 42 and 44 that match holes 46 and 48 of arm 18 so that the backing plate and horizontal arm may be secured together by machine screws as screw 50.

The planes of sections 36 and 38 are preferably parallel and angled from the vertical at approximately 30 degrees. Looseleaf ring strip 52 is positioned on the center section 40 of the backing plate and has two holes aligned with holes 42, 44 so that it is securely held in place. The looseleaf ring strip is of conventional construction and, as is well understood, may be conveniently opened and closed by operating the short levers 54.

The bottom end of the backing plate is bent backwardly as at 56 and contains suitable holes to receive machine screws for mounting on the top or horizontal surface of a monitor. This is a still further alternative to the side mountings.

The outer surface of the vertical arm 16 has secured thereto a fastening material 58 such as Dual Lock reclosable fastener manufactured by the 3M Company. This is a reclosable fastener with mushroom type plastic mating surfaces that has superior strength and closure properties facilitating the removal and reinstallation of the holder. The Dual Lock strip 58 is secured by peeling off a liner to expose a pressure sensitive adhesive surface that will firmly adhere to the back surface of arm 16. The mating member 60 is shown with the liner 62 partially peeled away.

The exploded view in FIG. 3A contemplates left hand mounting with the Dual Lock strip 60 secured to the left side of the monitor. It is seen from FIG. 4 that with the backing plate at an angle with the vertical the pages 64 in the loose leaf ring are in a stable condition. That is the lower group of pages will hang from the ring whereas the upper group will rest against section 36 of the backing plate and be held and retained in place by the circular rings. This is a particularly advantageous feature in that the operator can flip open the pages to the page he wants and it will stay in the open position at the page chosen by the operator. He does not have to hold the pad open at the desired page and both his hands are free for other operations. Also this facilitates both writing and retrieving information on both sides of a page. Certain of the divider pages will have index tabs as 66 shown in FIG. 1 for labeled organization of the operator's material.

Figure 2:
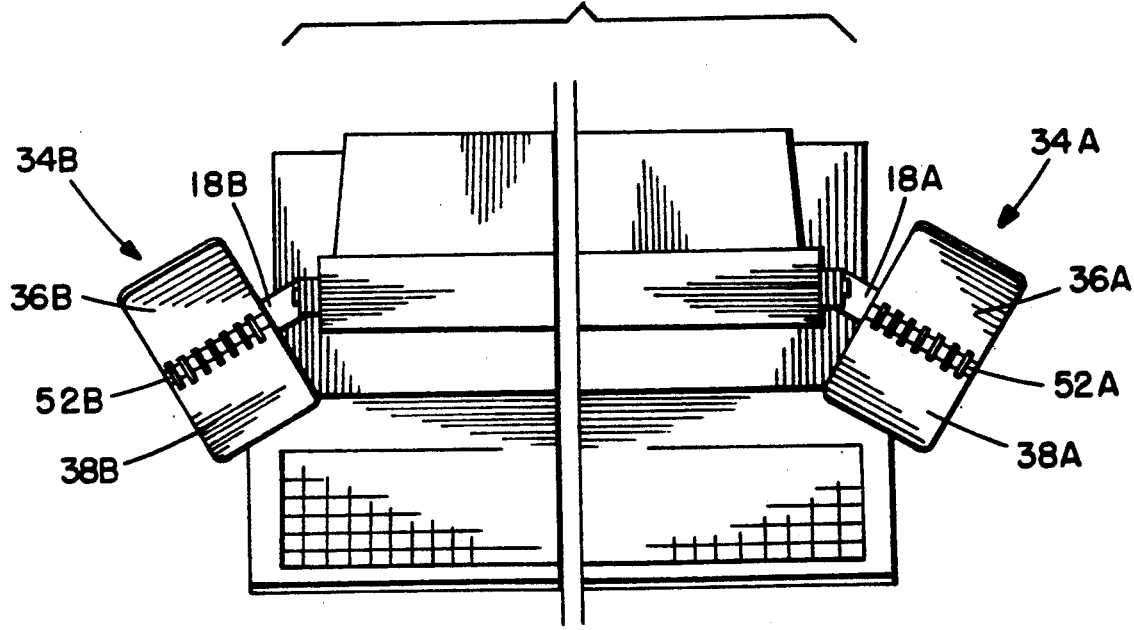
FIG. 2 is a top view of a portion of two computers showing both left side and right side mounting of the document holder.

FIG. 3B is an exploded view showing the document holder arranged for right hand mounting with the vertical arm 16 positioned to be secured to the left end of horizontal arm 18. In this case the arm 18 is inverted so that the bent over end 20 extends upward and 22 which is not used for left handed mounting extending downward. To facilitate the proper orientation of arm 18 in left or right side mounting, the letters L and R are inscribed on the appropriate sides of the arm. FIG. 2 shows both left and right handed mounting with numbers corresponding to those in FIG. 3A and FIG. 3B with the letters A and B respectively.

A particularly novel feature of the present invention is the compound angle resulting from the bent over ends 20 and 22 of arm 18. As noted above, the lines of bending, 24 and 26, are at an angle with the axis of the arm and it is this angle that determines the angle of the holder and of the pad with respect to the face of the monitor screen. Thus in both left and right mounting the pad will be horizontally angled with the screen so that the distance from the operator's eye to both pad and screen will be approximately the same to avoid eye refocusing and resulting eye fatigue of the operator.

The angling back and forward of the backing plate is a result of both the disposition of the bends of end member, 22 and the angle of section 36, 38 of the backing plate.

In summary, the document holder is designed to be firmly secured to either the right or left side of a computer terminal to permit jotting down and retrieval of information generally pertinent to computer operation. It includes a suitable ring binder and pad with tabbed separators for organization of recorded information. This feature permits ready retrieval by merely turning the assembled pages to desired data as correlated with tab labels.

Figure 4:
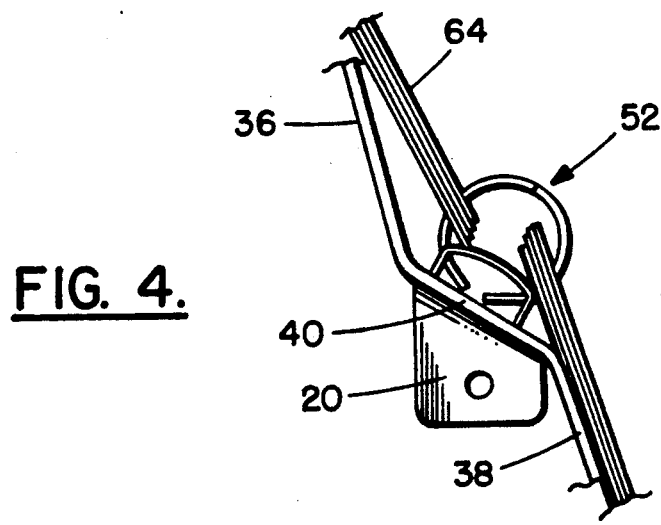
FIG. 4 is a side view showing the holder and pad of documents.

The appropriate disposition of ends 20, 22 of arm 18 results in a compound angle of the arm. That is, a first resulting horizontal angle is that of the outer end of the arm angling forward so the holder is at an angle with the monitor screen as seen in the top view of FIG. 2. The second resulting vertical anngle is that the surface of arm 18 is at an angle with the horizontal as shown in FIG. 4. This determines the angle of offset surface 40 and hence the disposition of the ring binder 52 to retain the turned pages of the pad in the position chosen by the operator. This angle of arm 18 along with the bend angles of 36, 38 also determine the angle of the pad.

Although the pad holder has been described in connection with a computer terminal, it is understood that it can be mounted and utilized on other devices where convenient recording and retrieval of information is desired.

Having thus described the invention with particular reference to the preferred forms thereof, it will be obvious that various changes and modifications may be made therein without departing from the spirit and scope of the invention as defined in the appended claims:

What is claimed is:

1. A device for holding a pad of papers adjacent to a computer monitor screen comprising:
   an L-shaped bracket including a vertical arm and a horizontal arm;
   said horizontal arm having two ends each of which is bent in an opposite direction perpendicular to the axis of the said horizontal arm;

the intersection of each bent end and the plane of the horizontal arm forming an acute angle with the axis of the horizontal arm;

the said acute angles associated with the two bent ends being substantially equal means to secure the vertical arm selectively to each of the two bent ends of the horizontal arm;

an elongated backing plate having an offset portion;

loose leaf ring means located on the offset portion of the backing plate;

means to secure the loose leaf ring means and backing plate to the horizontal arm of the said L-bracket; and means to releasably secure the vertical arm of the L-bracket to the side of a monitor.

2. A device for holding a pad of papers adjacent to a computer monitor screen comprising:

an L-bracket having a flat vertical arm and a flat horizontal arm;

securing means secured to the outer face of the vertical arm to secure the L-bracket to the vertical side of a computer monitor;

a pad backing plate adopted to hold a pad of papers secured to the horizontal arm of said L-bracket; and the longitudinal axis of the horizontal arm being at an acute angle to the plane of the flat vertical arm whereby the pad backing plate is disposed at an angle to the monitor screen.

3. The device set forth in claim 2 in which the pad backing plate is disposed at an acute vertical angle.

4. The device set forth in claim 3 including a looseleaf ring strip secured to the pad backing plate to provide for vertical turning of pages of a looseleaf pad.

5. The device set forth in claim 4 in which the pad backing plate has an offset section to which the looseleaf ring strip is secured and an upper and lower section adapted to support looseleaf pages.

6. The device as set forth in claim 5 in which said securing means comprises a pair of mating fastener means one of which is secured to the said vertical arm and the other is adapted to be secured to the side of the computer monitor.

7. A device for holding a pad of papers adjacent to a computer monitor screen comprising:

bracket means adapted to be selectively secured to either side of a monitor;

pad backing means secured to the bracket means;

looseleaf ring binder means secured to the pad backing means;

said bracket means having a first arm adapted to be secured to the vertical side of a monitor and a second arm adapted to support the pad backing plate; and said first and second arms are angularly disposed to provide an acute horizontal angle between the monitor screen and the pad backing plate.

8. The device set forth in claim 7 in which said backing plate is disposed at an acute vertical angle with respect to the monitor screen.

9. The device set forth in claim 8 in which the pad backing plate has an offset portion to receive the looseleaf ring binder means.

10. The device set forth in claim 9 in which the loose leaf ring binder means is horizontally disposed.

11. The device set forth in claim 10 including a pad of documents secured in the ring binder means for vertical turning of pages.

12. The device set forth in claim 11 including page divider means and tab means secured to the edges of the divider means.

13. The device set forth in claim 9 in which the pad backing plate has a second offset portion adapted to secure the device to the horizontal top portion of a monitor.

* * * * *